April 22, 1941.  P. R. DE PERMENTIER  2,239,220
CUBING OR PELLETING MACHINE FOR FEEDS.
Filed July 15, 1939
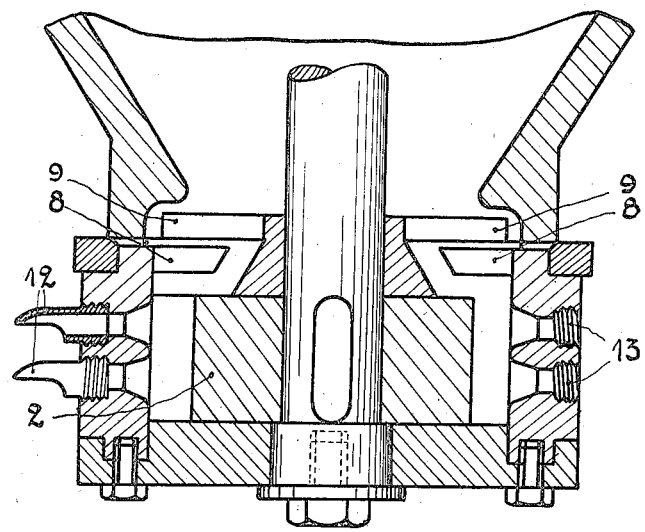
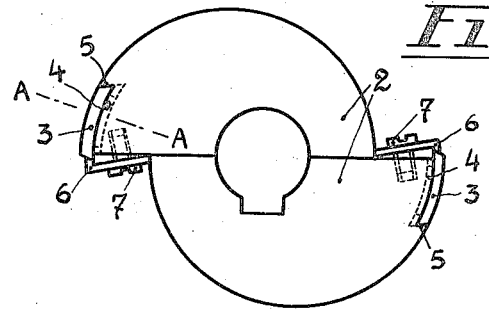
Inventor:
Paul René De Permentier
By Young, Emery & Thompson
Attorneys Patented Apr. 22, 1941

2,239,220

UNITED STATES PATENT OFFICE 2,239,220

CUBING OR PELLETING MACHINE FOR FEEDS

Paul René De Permentier, Brussels, Belgium

Application July 15, 1939, Serial No. 284,804
In Belgium July 19, 1938

5 Claims. (Cl. 107—8)

The present invention relates to a cubing or pelleting machine for feeds in which the cubes or pellets are obtained with the aid of a perforated die and a cam having relative rotary movement.

In one form of construction, the die has an annular shape and the cam rotates within the die. This cam is provided with one or several bosses which give a wedge-action to the feed introduced, forcing the material outwards through the holes of the die. When symmetrical bosses are provided on the cam, the reactions caused by the compression of the material are balanced or nearly balanced.

The cam presents wear-resisting segments which are renewable. These segments are symmetrical in shape, so they can be turned over with the purpose of using both ends.

In one particular construction according to the invention, the cam may consist of two half-cylinders welded or united together after relative displacement. This method permits the machining of peripheral grooves, for example, by turning.

Other features of the invention will appear from the following description with reference to the accompanying drawing which shows a non-limitative example of one construction according to the invention.

The invention further covers the various original features of the arrangement shown.

In the drawing:

Fig. 1 is a partial section of a machine according to the invention.

Fig. 2 represents the cam.

Fig. 3 is a section along line A—A through one of the removable wearing segments of the cam.

The cam of the cubing or pelleting machine according to the present invention consists essentially of two identical semi-cylinders 2 welded together after a relative displacement, so as to form two symmetrical bosses. These semi-cylinders may be grooved or machined so as to receive removable curved wearing-segments 3.

These wearing-segments 3, the ends of which are for instance bevelled, may be provided with a projection 4 the aim of which is to engage said groove or recess on the periphery of the semi-cylinders. One of the bevelled ends passes under an inclined edge 5 of the cam while the other is held by a bridge-piece 6 which is fixed to the cam by means of a screw 7.

The cam housing is preferably provided with fixed radial blades 8 while the cam itself is generally surmounted by an agitator with radial or nearly radial rotary blades 9.

The object of the blades 8 and 9 is essentially to break up the cakes of material which might tend to escape upwards from the seizing action of the cam and cause them to return to the working zone.

It will be apparent without further explanation that these devices give a final mixing during the last part of the treatment.

It is to be noted that the cam, instead being centered in the middle of the die, could with advantage be made floating so as to take continuously the position of exact equilibrium under the existing reactions.

A further important feature of the machine according to the invention is the cube or pellet breaker. The principle of this device is to use a curved guide which breaks the compressed material, in given lengths. For this purpose the die is provided in one form of construction, with nozzles 12 the upper wall of which is extended and bent downward. These inserted nozzles can be made interchangeable and allow the cutting length to be varied as desired. The same object can be attained by the use of individual or the use of common curved guides. The height of the cam can be selected so as to permit the superposition of several sets of holes such as 13 on the periphery of the die.

The invention is obviously not limited to the embodiment described but covers any construction coming within the scope of the appended claims.

What I claim is:

1. In a press of the character described, a fixed annular casing provided with a plurality of openings in its lateral wall and mounted with its axis vertical, a shaft extending vertically through said casing, and a compressor element mounted on said shaft, said element comprising two semi-cylindrical bodies with their axial faces joined together and with their axes radially offset relative to each other and to the axis of said shaft.

2. In a press of the character described, a fixed annular casing provided with a plurality of openings in its lateral wall and mounted with its axis vertical, a shaft extending vertically through said casing, a compressor element formed of two joined radially offset semi-cylindrical bodies and mounted on said shaft, and wear-resistant plates detachably mounted on the surfaces of the compressor most adjacent the casing.

3. In a press of the character described, a fixed annular casing provided with a plurality of openings in its lateral wall and mounted with its axis vertical, a shaft extending vertically through said casing, a compressor element formed of two joined radially offset semi-cylindrical bodies and mounted on said shaft, the semi-cylindrical surfaces of the compressor adjacent the outermost portions thereof having grooves provided therein, and wear-resistant plates, provided with tongues adapted to enter said grooves, detachably mounted on said grooved surfaces.

4. In a press of the character described, a fixed annular casing provided with a plurality of openings in its lateral wall and mounted with its axis vertical, a shaft extending vertically through said casing, a compressor element formed of two joined radially offset semi-cylindrical bodies and mounted on said shaft, the semi-cylindrical surfaces of the compressor adjacent the outermost portions thereof being cut away to provide recesses opening on diametrical planes and terminating in dovetail-like shoulders, wear-resistant plates positioned in said recesses with one edge engaging said shoulders, and detachable means engaging the other edge of said plates to retain the same in said recesses.

5. In a press of the character described, a fixed annular casing provided with a plurality of openings in its lateral wall and mounted with its axis vertical, a shaft extending vertically through said casing, a compressor element formed of two joined radially offset semi-cylindrical bodies and mounted on said shaft, and bent nozzles screwed into the openings of said casing to break the material extruded through the openings into pellets of given lengths.

PAUL RENÉ DE PERMENTIER.